(12) United States Patent
Taniguchi et al.

(10) Patent No.: US 6,337,456 B1
(45) Date of Patent: Jan. 8, 2002

(54) WELDING MACHINE AND METHOD FOR ASSEMBLING SAME

(75) Inventors: Junichi Taniguchi; Hideo Tahara, both of Kanagawa (JP)

(73) Assignee: Dengensha Manufacturing Company Limited, Kanagawa (JP)

(*) Notice: Subject to any disclaimer, the term of this patent is extended or adjusted under 35 U.S.C. 154(b) by 0 days.

(21) Appl. No.: 09/458,070

(22) Filed: Dec. 10, 1999

(30) Foreign Application Priority Data

Dec. 16, 1998 (JP) .......................................... 10-375638

(51) Int. Cl.⁷ .......................... B23K 11/30; B23K 11/31
(52) U.S. Cl. ................. 219/86.25; 219/86.61; 219/86.41
(58) Field of Search .......................... 219/86.25, 86.61, 219/86.41, 90

(56) References Cited

U.S. PATENT DOCUMENTS

| | | | | |
|---|---|---|---|---|
| 4,904,838 A | * | 2/1990 | Szantho et al. ............ 219/86.8 |
| 5,026,963 A | * | 6/1991 | Saito et al. .................... 219/89 |
| 5,239,155 A | * | 8/1993 | Olsson ..................... 219/86.25 |
| 5,386,092 A | * | 1/1995 | Dufrenne ................. 219/86.32 |
| 5,528,011 A | * | 6/1996 | Kono et al. .............. 219/86.41 |
| 5,818,007 A | * | 10/1998 | Itatsu ....................... 219/86.25 |
| 5,898,285 A | * | 4/1999 | Nagasawa et al. ..... 318/568.13 |
| 5,914,056 A | * | 6/1999 | Yamaguchi .............. 219/86.41 |
| 5,981,898 A | * | 11/1999 | Yamaguchi .............. 219/86.41 |
| 5,988,486 A | * | 11/1999 | Kobayashi et al. ......... 228/212 |
| 6,064,028 A | * | 5/2000 | Schmid-Doernte ....... 219/86.41 |
| 6,075,219 A | * | 6/2000 | Furukawa et al. .......... 219/119 |

* cited by examiner

Primary Examiner—Tom Dunn
Assistant Examiner—Colleen P. Cooke
(74) Attorney, Agent, or Firm—Sughrue Mion, PLLC

(57) ABSTRACT

In a resistance welding machine, an arm including one electrode tip, a drive unit including a linear guide for driving another electrode tip corresponding to the one electrode tip, and a welding unit including a welding transformer for passing a secondary current through a gun bracket for supporting the present resistance welding machine on a robot and/or the present resistance welding machine, can be mounted and removed individually as a unit with a common base or a rail main body including the linear guide as the reference thereof.

11 Claims, 7 Drawing Sheets

WELDING MACHINE AND METHOD FOR ASSEMBLING SAME

BACKGROUND OF THE INVENTION

The present invention relates to an electric resistance welding and, in particular, to a spot welding gun (including a C type and an X type), a spot welding machine of a stationary type, a projection welding machine, and a resistance seam welding machine; and, in particular, to a resistance welding machine in which a linear guide is used in a guide mechanism of a press type for opening and closing an electrode tip on the movable side thereof, and various unit parts of the present resistance welding machine individually unified according to the functions of the welding machine are assembled together with a common base or the rail main body of a linear guide as the reference thereof, and a method for assembling such resistance welding machine.

As a conventional spot welding gun, there is known a spot welding gun which uses a linear guide system in a movable-side electrode tip drive mechanism. A conventional spot welding gun of this type is disclosed, for example, in the specification and drawings of Japanese Patent Unexamined Publication No. Hei. 10-34346.

In the conventional spot welding gun of this type, a second gun arm disposed so as to correspond to a first arm gun fixed to a gun main body is driven along the gun main body by a pressure drive mechanism comprising a ball screw, a sliding nut, a linear guide and servo motor each disposed within the gun main body, two lap plates (works) are held together by and between two electrode tips, and a pressing force necessary for welding is given to the two electrode tips as well as a welding current is passed through the two electrode tips to thereby heat and weld together the respective welding portions of the two lap plates (works).

According to the conventional spot welding gun of this type, when compared with the conventional welding guns that have been used so far, the interfering portions thereof are decreased to thereby reduce restrictions on the moving passages and welding positions thereof. Thanks to this, according to the sizes and shapes of members to be welded, the gun arm can be recomposed freely each time the stroke thereof varies.

However, since the conventional spot welding gun of this type is structured such that the pressure drive mechanism is disposed in the inside portion of the gun main body integrally therewith, when assembling a welding transformer and an equalizing device into the spot welding gun. That is, the current assembling method finds it difficult to assemble or recombine various units according to the functions of the welding gun.

SUMMARY OF THE INVENTION

The present invention aims at eliminating the drawbacks found in the above-mentioned conventional welding machines.

In solving the above problems, according to the invention, there is provided a method for assembling a resistance welding machine, the method comprising the steps of:

providing a common base of the resistance welding machine;

mounting fixedly and detachably an arm onto the common base with a first detachable securing member, the arm including an electrode tip of the resistance welding machine;

mounting fixedly and detachably a drive unit onto the common base with a second detachable securing member, the drive unit driving a mating electrode tip mating with the electrode tip; and mounting fixedly and detachably a welding unit onto the common base with a third detachable securing member, the welding unit including at least one of a welding transformer which can apply a secondary current to the resistance welding machine and a gun bracket for supporting the resistance welding machine onto a robot.

According to the above-mentioned method as set forth in the present invention, when compared with the conventional spot welding gun, instead of forming a pressure drive mechanism in the inside portion of a gun main body integrally therewith, the gun arm, welding transformer, drive unit and the like can be mounted and removed individually as a unit with the common base as the reference thereof. Thanks to this, not only there is eliminated the need for new design of the structure of the spot welding gun, but also the units standardized according to functions of the spot welding gun can be assembled or recombined easily according to uses.

In the above-mentioned method according to the present invention, it is preferable to further comprises the steps of:

mounting fixedly and detachably an equalizing unit onto the common base with a fourth detachable securing member, the equalizing unit has one of a function for positioning the mating electrode tip relative to the electrode tip and a function for correcting a moving amount of the mating electrode tip relative to the electrode tip.

Accordingly, the equalizing unit can be easily mounted and removed according to the variations of the welding machine similarly to the above-mentioned unit parts.

The above-mentioned drawbacks can be solved by a resistance welding machine according to the present invention comprising:

a common base;

an arm including an electrode tip of the resistance welding machine, the arm being fixedly and detachably mounted onto the common base by a first detachable securing member; of an electric pressure type a drive unit driving a mating electrode tip mated with the electrode tip while the electrode tips are subjected to an electric pressure, the drive unit being fixedly and detachably mounted onto the common base by a second detachable securing member;

a welding unit including at least one of a welding transformer which can apply a secondary current to the resistance welding machine and a gun bracket for supporting the resistance welding machine onto a robot, the welding unit being fixedly and detachably mounted onto the common base with a third detachable securing member.

In the resistance welding machine, it is advantageous that the drive unit comprises:

a ball screw shaft, a nut linearly moved in accordance with a rotation of the ball screw shaft and supporting the mating electrode tip, and a unit main body for rotatably supporting the ball screw shaft and guiding the linear movement of the nut while a plurality of balls are rolled between the nut and the unit main body.

According to the welding objectives are satisfied:
(1) High assembling accuracy can be obtained easily;
(2) Because the rigidity of the drive unit can be enhanced and the weight thereof can be reduced, the followability thereof can be enhanced in the welding operation;
(3) Assembly and maintenance can be facilitated;
(4) It is possible to omit an electrode rotation stop mechanism which is necessary when a guide center and an electrode pressure center are present at offset positions; and
(5) As to the drive unit, mass-producible commercial standardized products can be used, which makes it possible to reduce the cost of the drive unit to a great extent.

Further, according to the welding machine, since the two sides of the common base can be used as the mounting reference, according to the variations of the welding machine, the equalizing unit, gun arm, and welding transformer can be mounted and removed as well as replaced as a unit easily. And, they can be manufactured with the weight and size thereof reduced.

In the above-mentioned welding machine, it is also preferable to include:
an equalizing unit having one of a function for positioning the mating electrode tip relative to the electrode tip and a function for correcting a moving amount of the mating electrode tip relative to the electrode tip, the equalizing unit being fixedly and detachable mounted onto the common base with a fourth detachable securing member,
wherein the equalizing unit includes an air circuit for canceling a load corresponding to a dead weight of the resistance welding machine.

In the above-mentioned welding machine, it is further preferable that the air circuit is provided with a balancing cylinder for executing at least one of an air pressure increasing and decreasing operation and a direction switching operation, to thereby obtain a weight balance of the resistance welding machine.

According to this, the equalizing operation and the balancing operation are not executed according to the program stored on the robot side, but these operations are carried out by using an independent equalizing mechanism and a balancing air pressure circuit. Therefore, there is eliminated the need to increase the number of robot control shafts and add software for allowing the fixed-side electrode tip to touch softly or approach the work; and, the one-shaft servo spot gun may be simply added to the current number of robot control shafts. This makes it possible to simplify the structure of the welding machine as well as reduce the installation cost thereof.

Furthermore, it is also preferable that the common base is formed of aluminum based material.

According to this, the weight reduction of the common base can be facilitated, thereby being able to reduce the weight load to be carried by the robot wrist.

The above-mentioned drawbacks can be solved by a spot welding machine comprising:
a gun arm having an electrode tip;
an electrode drive unit having
  a ball screw shaft,
  a nut linearly moved in accordance with a rotation of the ball screw shaft and supporting the gun arm, and
  a guide rail body extending in parallel with the ball screw shaft and guiding the linear movement of the nut while a plurality of balls are rolled between the nut and the unit main body;
a holding member holding a mating electrode tip mated with the electrode tip, the holding member being fixedly and detachably mounted onto the guide rail body with a detachable securing member; and
a welding unit including a welding transformer which can apply a secondary current to at least one of the resistance welding machine and a gun bracket for supporting the resistance welding machine onto a robot, the welding unit being fixedly and detachably mounted onto the guide rail body with a detachable securing member,
wherein an electric pressure between the electrode tips are generated by the electrode drive unit.

According to the welding machine, when compared with the conventional welding gun in which a drive mechanism is formed in the inside portion of a gun main body integrally therewith, with the rail main body as the reference, the gun arm, gun bracket, equalizing unit, welding transformer and the like can be mounted individually as a unit. This eliminates the need for new design of the structure of the robot gun with a welding transformer incorporated therein. Also, in this case, the above-mentioned common base can be omitted, which can facilitate further reduction of size and weight of the welding machine.

In addition, in the above-mentioned welding machine, it is advantageous that the holding member is one of a point holder including the mating electrode tip and a gun arm member including the point holder.

Since the gun arm is directly connected to the output terminal of the welding transformer, at least one side secondary bar can be omitted. This makes it possible to reduce the number of parts, the number of man-hours for assembling, and the weight of the welding machine.

Moreover, the above-mentioned drawbacks can be solved by a spot welding machine according to the present invention, the ball screw shaft is combined into the nut block of a linear guide and the ball screw shaft is driven by a motor to thereby allow an electrode tip movable by the nut block to generate a torque for obtaining pressure necessary for welding, wherein said ball screw shaft has a right screw and a left screw, a nut block N1 for a right screw and a nut block N2 for a left screw are combined into said ball screw shaft respectively, two mutually opposing gun arms are respectively mounted on said nut blocks N1 and N2, and two mutually opposing electrode tips respectively supported by said gun arms can be driven simultaneously from both sides by a single electric motor.

DETAILED DESCRIPTION OF THE PREFERRED EMBODIMENTS

Now, description will be given below of the preferred embodiments of the invention with reference to the drawings.

First Embodiment

Figure 1:
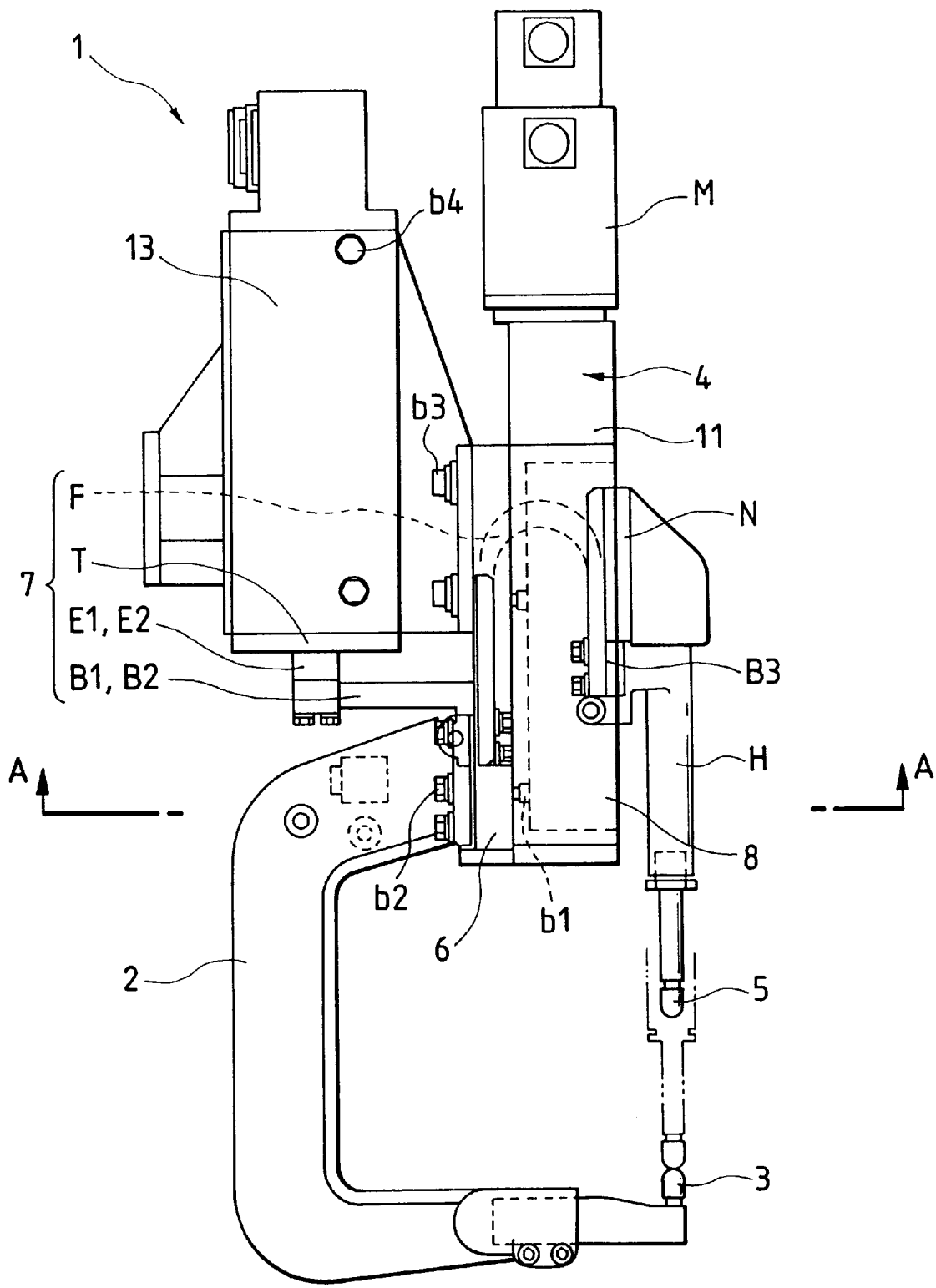
FIG. 1 is a side view of the outer shape of a welding gun according to a first embodiment in which a method according to the invention is enforced in a resistance spot welding gun of a C type.
Figure 2:
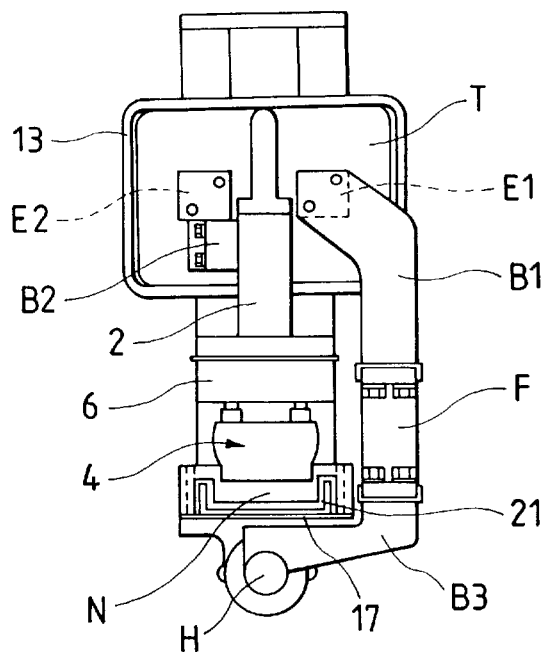
FIG. 2 is a view taken along the arrow line A—A shown in FIG. 1.
Figure 3:
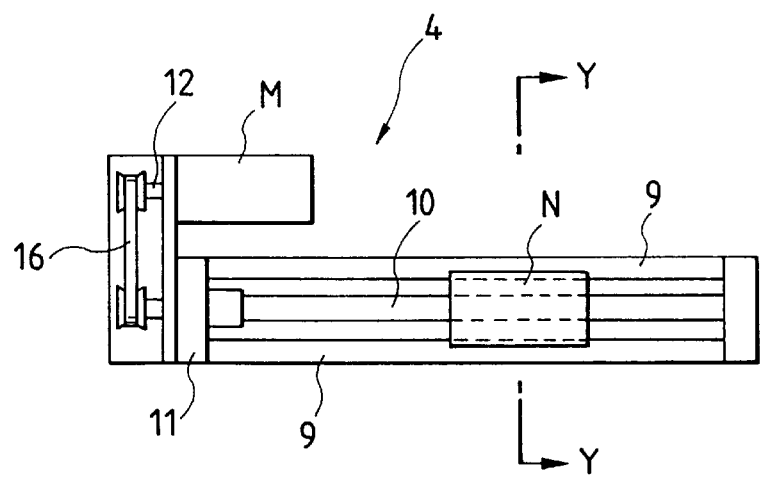
FIG. 3 is a plan view of an example of a linear guide actuator including a drive unit according to the invention.
Figure 4:
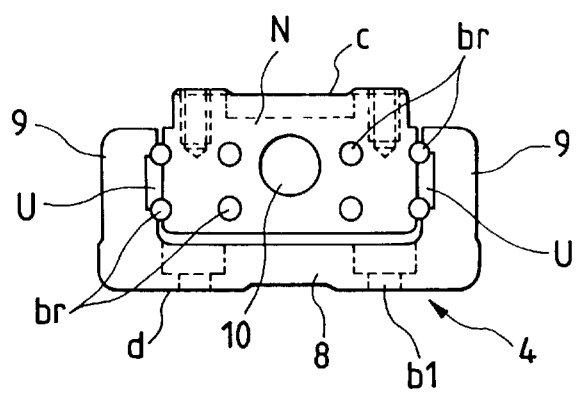
FIG. 4 is an enlarged view of FIG. 3, taken along the Y—Y line shown in FIG. 3.

FIG. 1 is a side view of a first embodiment in which a method according to the invention is enforced in a servo spot welding gun of a C type. FIG. 2 is a view taken along the arrow line A—A shown in FIG. 1. FIG. 3 is a plan view of an example of a drive unit. FIG. 4 is a view taken along the arrow line Y—Y shown in FIG. 3.

In the drawings, reference character 1 designates a resistance welding machine and, in particular, here, it designates a so called servo spot gun for a robot which uses a servo motor M as an actuator for driving electrode tips. 2 stands for a gun arm of a C type, to the leading end of which one electrode tip is to be fixedly secured. 4 designates a drive unit for driving another electrode tip 5 corresponding to one electrode tip 3. 6 stands for a common base to which various unit parts are to be assembled, while the common base is formed of aluminum-system material with weight reduction taken into account.

And, 7 designates a welding unit. This welding unit 7 comprises a welding transformer T for passing a secondary current through the present resistance welding machine, bus bars B1, B2 and B3 cooperating together in forming a secondary circuit which is connected to the output terminals E1 and E2 of the present welding transformer T, and a shunt F to be connected to a point holder H on the movable side of the present resistance welding machine, and the like.

The drive unit 4, which may be a unit that is generally on the market, comprises, for example, as shown in FIGS. 3 and 4, a rail main body 8 having a recess-shaped section, and a pair of linear guide rails 9 which are disposed in parallel to each other on the two sides of the rail main body 8 having a recess-shaped section, while each of the guide rails 9 includes on the inner side thereof a track surface U having a guide groove formed therein. In the rail main body 8 of the drive unit 4, there is formed a mounting surface d which can be mounted onto the common base 6 by a plurality of bolts b1.

Within a groove formed in the rail main body 8 and having a recess-shaped section, a nut block N is assembled to a ball screw 10 which is disposed along the track surface U. In the nut block N, there is formed a mounting surface c for mounting the gun arm 2.

To the ball screw 10, there is directly connected the output shaft 12 of the electric servo motor M which is fixed to the housing 11 of the rail main body 8. Also, as the case may be, for example, in order to avoid an interference condition between a work and the electric servo motor M, the electric servo motor M, as shown in FIG. 3, may be turned back onto the side surface of the rail main body 8 and connected to the ball screw 10 through an arbitrary power transmission mechanism 16 such as a gear, a belt, a chain or the like.

In operation, if the ball screw 10 is rotated by the power of the motor M, then the nut block N is translated and the other electrode tip 5 is supported on the nut block side is thereby caused to advance forward to and retreat away from one electrode tip 3 disposed on the fixed arm side, thereby being able to carry out a welding pressure applying operation and an electrode releasing operation.

In a method for controlling the positioning and moving speed of the electrode tip 5 when pressure moving or release moving the electrode tip 5, for example, a position sensor such as an encoder or the like is mounted together with a speed sensor such as a tachometer generator or the like onto the motor M, the number of revolutions of the output shaft of the motor M or ball screw or ball nut or the like is converted to the number of pulses by the encoder, and the thus converted pulse number is then counted; and, at a timing when the thus counted pulse number reaches a set value corresponding to the moving distance of the electrode tip 5, the rotation of the motor M is controlled to thereby carry out the positioning of the electrode tip 5. Also, referring to the control of the moving speed of the electrode tip 5, signals from the tachometer generator are sequentially fed back and taken in as the speeds of the motor M, differences between the thus obtained speeds and the electrode position are operated and, in accordance with the results obtained by such difference operation, the electrode is accelerated and/or decelerated to thereby move the electrode or electrode tip 5 to a work welding position. By the way, referring to the control of the pressure between the electrode tips, the current of the armature of the motor M in the pressurized condition is detected, and the thus detected current is fed back to thereby control the pressure between the electrode tips.

The drive unit 4, in the present embodiment, consists of a drive device for applying pressure to a servo spot gun structured as a drive unit. Referring to the specific structure of the drive unit 4, for example, as shown in FIG. 4 which is a section view thereof, a plurality of balls stored in the inside portion of the nut block N are sequentially rolled to thereby guide the nut block N along a track surface formed in a direction where the block nut N can be translated.

Referring here to the common base 6, the gun arm 2 is fixed through an insulation plate to one of the two surfaces of the common base 6 by a plurality of bolts b2, and a gun bracket 13 having a robot mounting surface is fixed through another insulation plate to the same surface of the common base 6 by a plurality of bolts b3. To the gun bracket 13, there is fixed the welding transformer T by a plurality of bolts b4.

And, to the other surface of the common base 6, there is fixed the drive unit 4 by a plurality of bolts b1. The point holder H is fixed to the nut block N of the drive unit 4 by a plurality of bolts b5, while the other electrode tip 5 is supported on the leading end of the point holder H.

The rail main body 8 of the drive unit 4 includes a cover (in FIG. 2, it is designated by 17) which is disposed in the translating direction of the nut block N, thereby being able to protect the track surface and ball screw by preventing foreign bodies (such as spatters, water, oil, smoke and the like which are produced during the welding operation) from sticking thereto.

The cover 17 extends along the longitudinal direction of the rail main body 8 so as to cover the top portion of the rail of the rail main body 8, while the two ends of the cover 17 are fixed to the two sides of the housing 11 of the rail main body 8 respectively.

In the nut block N, there is formed a cover guide groove 21 which, when the nut block N moves along the rail, prevents the cover 17 from interfering with the movement of the nut block N. That is, the cover 17 passes through the guide groove 21 to thereby allow the nut block N to move with no trouble. This cover 17 may be replaced by a bellows.

Second Embodiment

Figure 5:
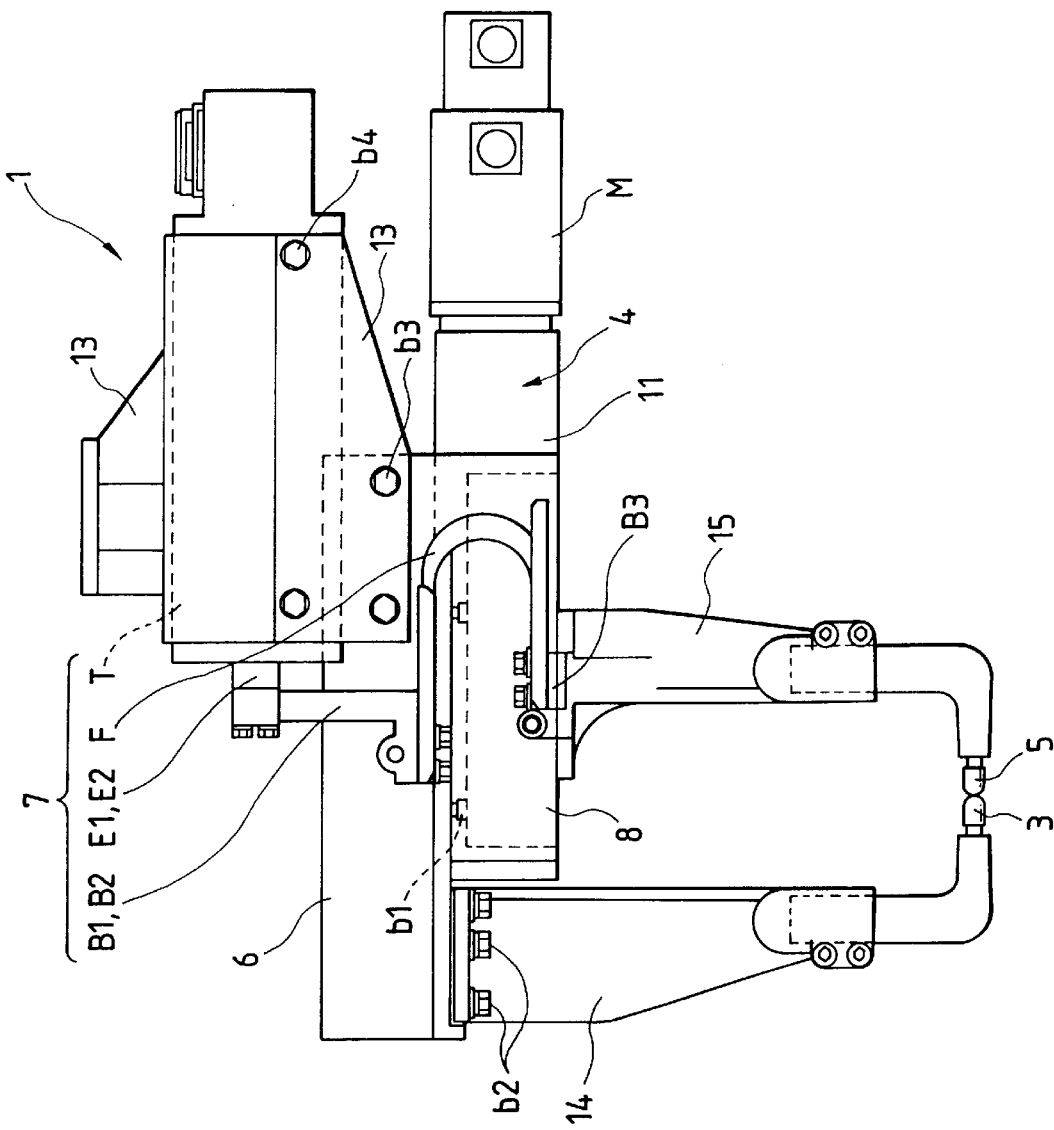
FIG. 5 is a side view of a second embodiment in which a method according to the invention is enforced in a resistance spot welding gun of another type, that is, an X type.

Next, FIG. 5 shows a second embodiment in which the invention is enforced in a conventional X type of spot welding gun for a robot.

In the present embodiment, a movable-side gun arm 15, which is disposed so as to correspond to a fixed-side gun arm 14 fixed to the main body of the present spot welding gun, is driven by an electrode drive unit which comprises a ball screw 10, a nut block N, a linear guide rail 9 and a servo motor M disposed in the rail main body; and, this is common to the conventional welding gun. However, the invention is different from the conventional welding gun in that, by using the common base 6, not only the gun arms and drive unit but also the welding transformer, equalizing unit and the like can be mounted and removed more easily according to the functions of the welding gun depending on the welding conditions, work interference conditions or other similar conditions.

According to the present assembling method, the section of the common base 6 is formed in a substantially U shape, the fixed-side gun arm 14 is fixed to one surface of the lower surfaces of the common base 6 through an insulation plate by a plurality of bolts b2, and the rail main body 8 of the drive unit 4 is fixed to the same surface by plurality of bolts b1. And, the movable-side gun arm 15 is fixed to the nut block N of the drive unit 4 by a plurality of bolts (not shown).

Also, with the two side plates of the common base 6 as the reference thereof, the bracket 13 is fixed through an insulation plate by a plurality of bolts b3, while a welding transformer T is firmly fixed to the bracket 13 by a plurality of bolts b4.

A drive unit 4 fixed to the common base 6, as shown in the previously described first embodiment, is structured such that a nut block N is incorporated into a linear guide rail (in FIGS. 3 and 4, designated by 9) and a ball screw 10.

The nut block N is composed of a translation unit which includes a plurality of sliding bodies or a plurality of rolling elements such as balls br or the like incorporated into a groove formed in the linear guide rail 9.

This guide unit is a unit which, by rotating the ball screw 10 using the electric motor M, the plurality of balls br are sequentially rolled along the track surface U or groove of the linear guide rail 9 to thereby guide the movement of the nut block N smoothly; and thus, the guide unit is able to open and close the movable-side gun arm 15 by means of the translation movement of the nut block N.

Third Embodiment

Figure 6:
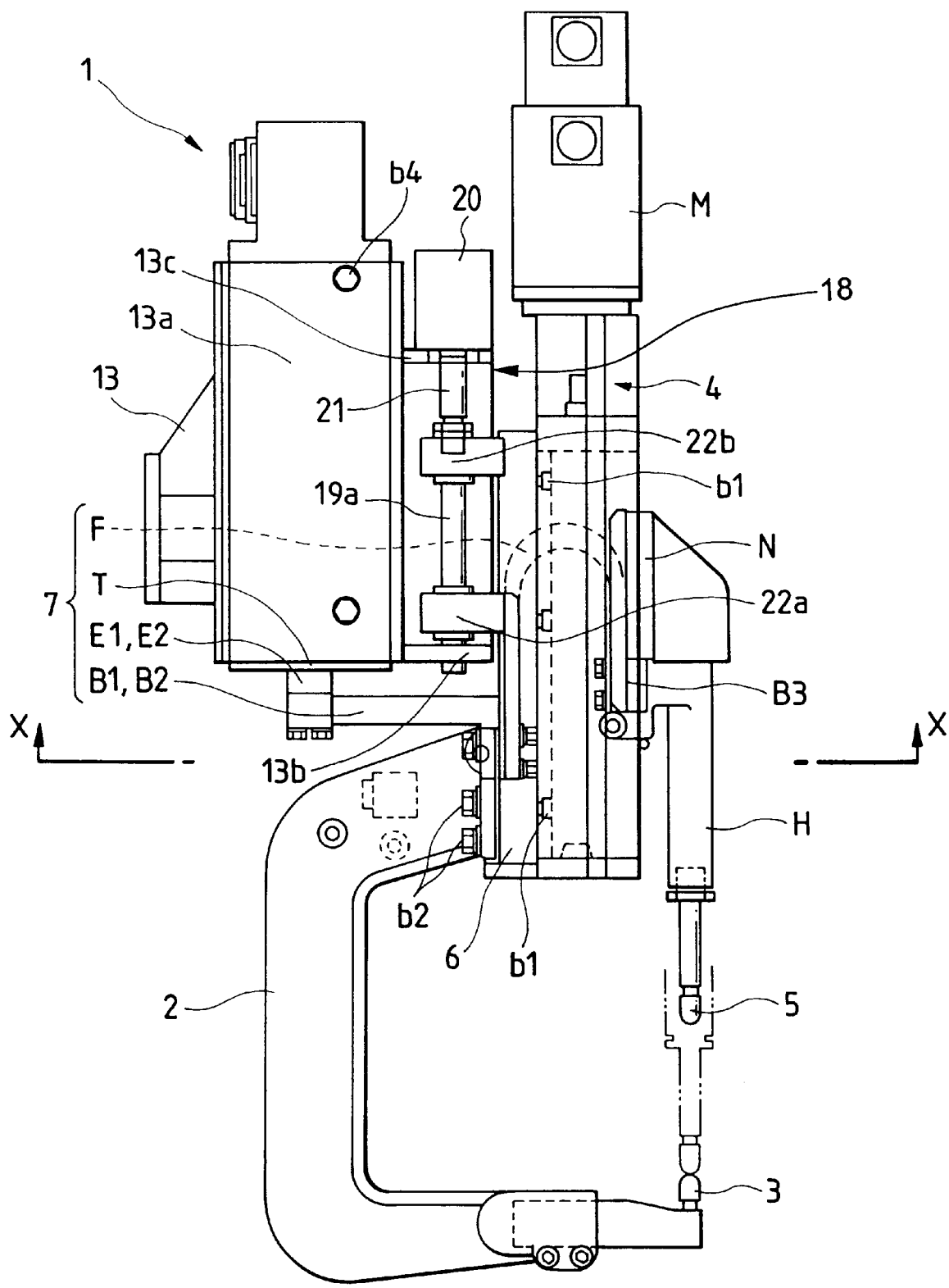
FIG. 6 is a side view of a third embodiment in which an equalizing unit is mounted on a welding machine according to the invention.
Figure 7:
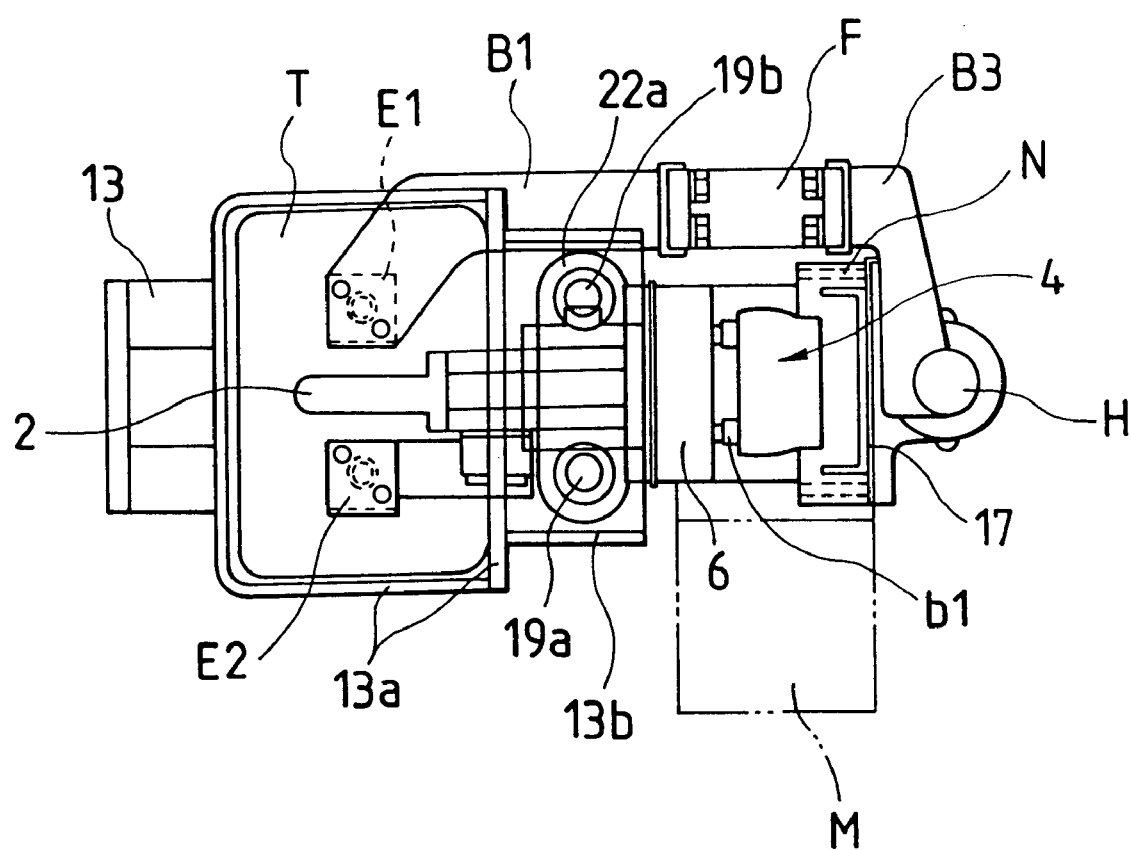
FIG. 7 is a view taken along the arrow line X—X shown in FIG. 6.

Next, FIG. 6 shows a third embodiment in which an equalizing unit 18 is mounted on a welding machine according to the invention. And, FIG. 7 is a view taken along the arrow line X—X shown in FIG. 6, in which a two-dot chained line shows the arrangement of an electric motor M turned back onto the side surface of the rail main body as in FIG. 3.

In this case, the equalizing unit 18 is structured such that the respective two ends of the two parallel guide rods 19a and 19b are fixed to their respective given positions of a common base 6 by rod support plates 13b and 13c which are each fixed to the transformer fixing plate 13a of a gun bracket 13.

And, the two guide rods 19a and 19b are each inserted through their associated housings 22a and 22b, which are mounted on the common base 6 integrally therewith or mounted on the common base 6 mechanically by tightening bolts or the like in such a manner that they can be mechanically removed from the common base 6; and also, the guide rods 19a and 19b are slidably supported.

The equalizing unit 18 includes a balancing cylinder 20 with a cylinder main body fixed to the gun bracket 13, while the piston rod 21 of the balancing cylinder 20 is connected to the housings 22a and 22b; and thus, due to an air pressure circuit capable of obtaining the weight balance effect of the gun main body with respect to the balancing cylinder 20, the whole of the welding gun can be floated so as to be able to absorb a reaction force generated when a movable-side electrode tip gives pressure to two works, thereby being able to prevent the works against deformation and strain.

Although the structure of the air pressure circuit is omitted in the drawings of the invention, in fact, for example, in the operating-side and return-side air pressure circuits of the balancing cylinder 20, there are disposed electromagnet valves which are capable of executing various operations such as an operation to increase and decrease an internal pressure and/or an operation to switch the direction of the internal pressure, and thud the air can be supplied in a direction in which most of the weight load of the welding gun can be cancelled by the air.

For example, in a direction in which weight balance can be obtained according to variations in the attitude of the welding gun by an electro-pneumatic proportional valve or the like, a previously set internal pressure is adjusted by switching an electromagnetic valve on and off in accordance with an external signal to thereby be able to adjust automatically a hydraulic pressure to the balancing cylinder 20.

Fourth Embodiment

Next, description will be given below of a fourth embodiment of the invention with reference to the following drawings. That is, FIG. 8 is a plan view of a welding gun according to the invention, and FIG. 9 is a side view of the whole of the present welding gun.

Figure 8:
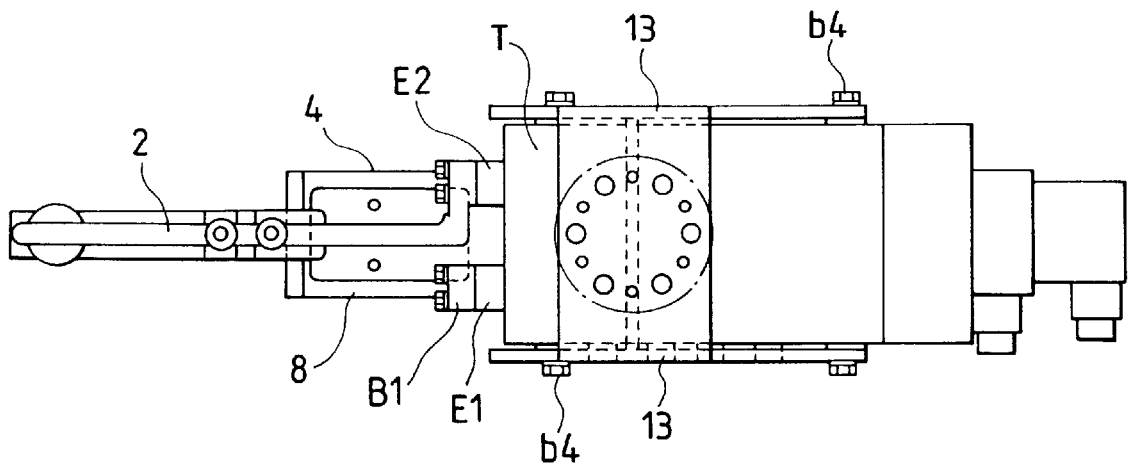
FIG. 8 is a plan view of a fourth embodiment of a welding machine according to the invention.
Figure 9:
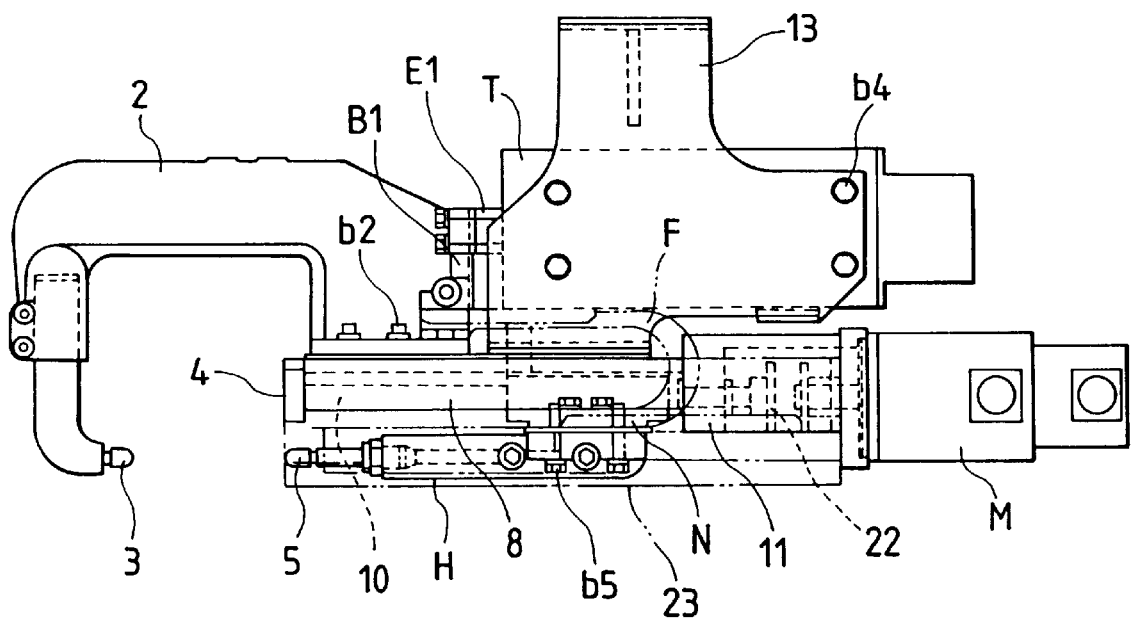
FIG. 9 is a side view of the whole of a welding machine according to the invention.

By the way, referring to reference characters used in FIGS. 8 and 9, the same functional components of the present welding gun as those used in the previously described embodiments (shown in FIGS. 1 to 7) are given the same designations and thus the detailed description thereof is omitted here.

In the welding gun shown in FIGS. 8 and 9, an electric motor M is used as a drive source for driving an electrode tip 5. On electrode tip 3 is fixed to the leading end of a gun arm 2 of a C type. A drive unit 4, which is used to drive the other electrode tip 5 corresponding to one electrode tip 3, is structured such that the gun arm 2 and gun bracket 13 are mounted directly onto the rail main body 8 of the drive unit 4 through an insulation plates by a plurality of bolts b2 and a plurality of bolts b3 respectively. In this case, the gun arm 2 may also be mounted directly on the gun bracket 13 side but in such a manner that it is insulated from the gun bracket 13 as well as from the rail main body 8.

In the rail main body 8, a nut block N is incorporated into a ball screw 10 which is disposed along a track surface formed in the rail main body 8. A gun arm (for example, in FIG. 5, a gun arm designated by 15) including the other electrode tip 5 or a point holder H is mounted directly on the nut block N by a plurality of bolts b5.

A bus bar B3 is formed integrally with the point holder H in such a manner that it projects from a point holder main body of the point holder H and, between the bus bar B3 and a bus bar B1 connected to the output terminal E1 of a welding transformer T which is used to pass a secondary current through the present welding gun, there is connected a shunt F which has flexibility corresponding to the translational movement of the nut block N on a straight line.

The ball screw 10 is connected through a coupling 22 to the output shaft of the electric motor M which is fixed to one housing 11 of the rail main body 8. As the electric motor M, generally, there are used a servo motor, a motor with a final reduction gear, and the like.

In the present embodiment, there is shown a case in which the output shaft of the servo motor is directly connected to the ball screw 10. However, as described above, when the electric motor M is disposed so as to extend long backwardly, as shown in FIG. 3, the electric motor M may be turned back onto the side surface of the rail main body 8 and then the output shaft of the electric motor M may be connected to the ball screw 10.

In the inside portion of the nut block N, there are stored a plurality of balls br, and thus the plurality of balls br are sequentially rolled on the track surface of the rail main body 8 to thereby guide the nut block N in a direction in which the nut block N is translated.

According to the present embodiment, instead of the cover 17 employed in the previously described embodiments, there is used an openable and closable box-shaped cover casing 23 which is disposed above the opening of the rail main body 8 to cover the whole of a sliding portion including the track surface of the rail main body 8, ball screw 10 and the like. Although not shown in FIGS. 8 and 9, in the cover casing 23, there is formed an opening or an escape groove which is used to avoid interference with the movable parts such as the bus bar B3, electrode tip 5, point holder H and the like which project outwardly of the cover casing 23. Due to provision of such opening or escape groove, since the above-mentioned sliding portion can be stored within the cover casing 23, the drive unit 4 can be protected against foreign bodies generated during the welding operation, such as spatters, water, oil, smoke and the like by preventing the foreign bodies from sticking to the drive unit 4.

In the welding gun according to the present embodiment, as described above, by rotating the balls screw 10 by means of the power of the electric motor M, the nut block N is translated and thus the other electrode supported on the nut block side is moved near to and away from on electrode tip 3 on the fixed arm side, thereby being able to apply pressure for welding or release such pressure.

Fifth Embodiment

According to the present embodiment, a driving ball screw shaft has two threaded portions, that is, a right screw and a left screw and thus two electrodes can be operated simultaneously by the output of a single electric motor, thereby being able to reduce the welding tact time down to half of the welding tact time required in the above-mentioned respective embodiments.

Figure 10:
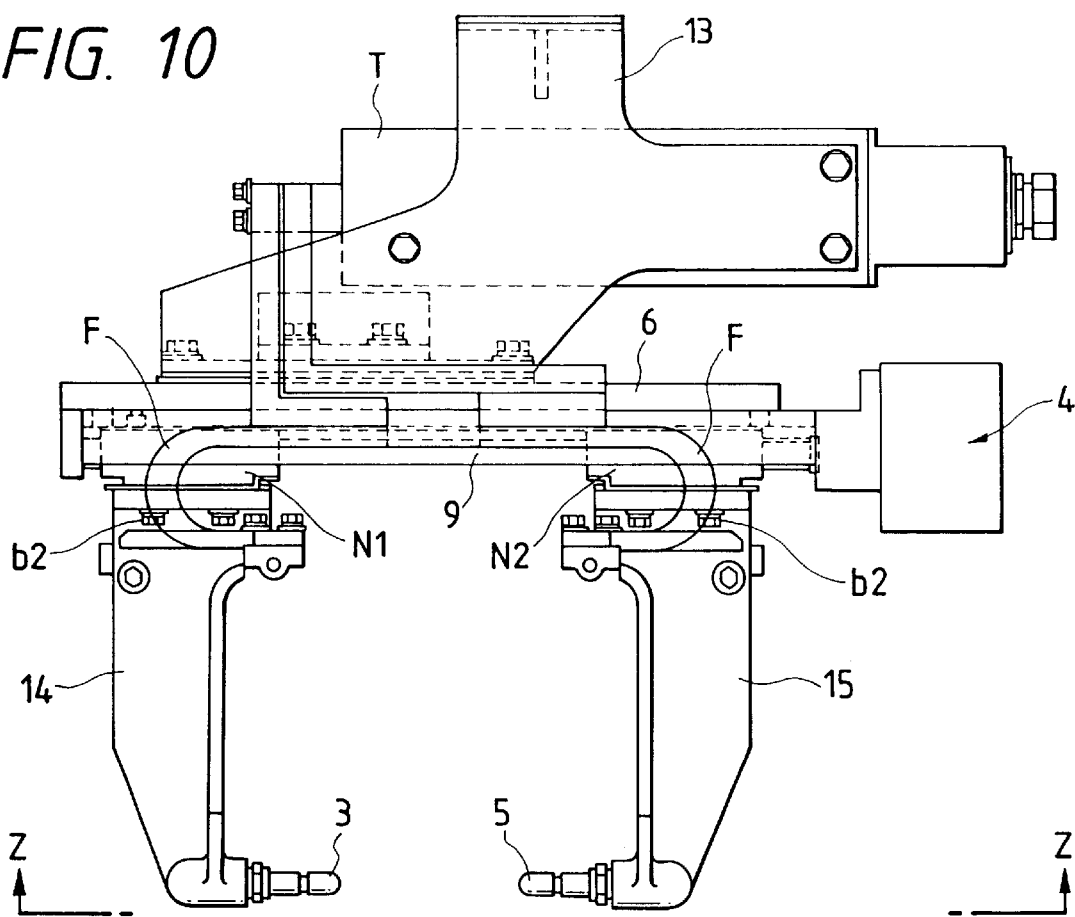
FIG. 10 is a plan view of a fifth embodiment of a welding machine according to the invention.
Figure 11:
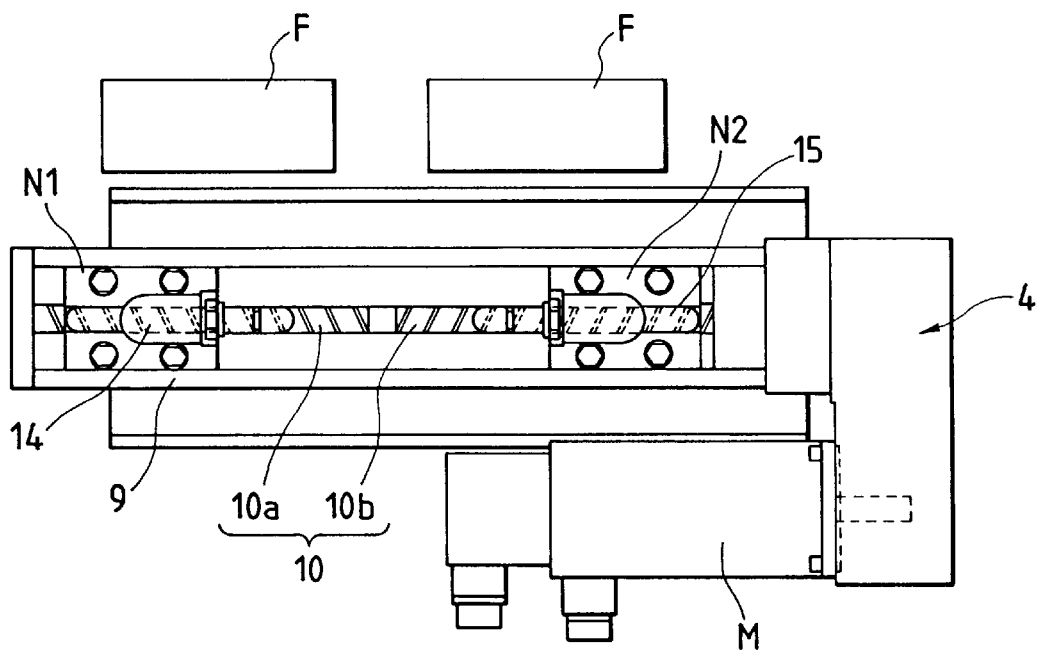
FIG. 11 is a view shown along arrow Z—Z in FIG. 10.

Now, FIG. 10 is a front view of a welding gun, showing a specific example of the fifth embodiment of the invention; and, FIG. 11 is a view taken along the arrow line Z—Z shown in FIG. 10. In FIGS. 10 and 11, the structure of a drive unit 4 is basically the same as that previously shown in FIGS. 3 and 4 and thus the detailed description thereof is omitted here.

In FIGS. 10 and 11, the same functional parts as those of the welding gun employed in the second embodiment previously discussed with reference to FIG. 5 are given the same designations. Specifically, in a welding machine of a type structured such that a ball screw is combined into the nut block of a linear guide and the ball screw is driven by a motor to thereby allow an electrode tip movable by the nut block to generate a torque for obtaining pressure necessary for welding, the ball screw shaft 10 has a right screw 10a and a left screw 10b. Also, a nut block N1 for a right screw and a nut block N2 for a left screw are combined into the ball screw shaft 10 respectively. And, two mutually opposing gun arms 14 and 15 are respectively mounted on their associated nut blocks N1 and N2 by bolts b2, while two mutually opposing electrode tips 3 and 5 are respectively mounted on the leading ends of their associated gun arms 14 and 15. According to the present embodiment, by rotating the single ball screw shaft using the single electric motor M, a work can be held simultaneously from left and right by and between the two electrode tips 3 and 5 and then can be pressure welded together, which makes it possible to reduce the welding tact time down to one half.

Now, description will be given below of the operation of the present invention with reference to FIG. 1.

The control elements of the welding gun such as the movements of the welding gun between points where welding operations are to be executed by the welding gun, the positioning of the welding gun, the releasing amount of the welding gun, the acceleration and deceleration of the welding gun and the like are previously taught or programmed in a robot controller; and thus a spot welding operation using the welding gun can be carried out by reproducing the thus programmed control elements of the welding gun.

If the welding gun is operated by the robot controller to move to a welding point and a welding position is inserted between the electrode tips, then the electric motor M is operated by an instruction from the robot controller and the ball screw 10 is thereby rotated. Due to this, the nut block N is translated along the linear guide, the two works are held by and between the movable-side electrode tip and the fixed-side electrode tip, pressure necessary for welding is applied to the two works, and a welding current is passed through between the two electrodes to thereby heat the welding points of the two works and connect them together.

These welding operations are executed continuously at every welding point one after another under the control of the programs stored on the robot side and, during such welding operations, the robot operation and the electrode opening and closing operation by the welding gun are carried out efficiently in a short welding time as the robot side shaft and one of the gun side shafts are controlled synchronously.

And, when many kinds of works are produced in the same production line, for example, when specifications such as the maximum pressures, the breast dimensions, maximum opening strokes and the like vary because the material and plate thickness of the works, or the shapes, sizes and welding positions of the works vary, in correspondence to this, the shapes and sizes of a gun arm and/or a point holder as well as units different in sizes such as a drive unit (including the selection of the capacity of the electric motor), a welding unit and the like are selected from a plurality of types of units according to uses and are then recombined together, thereby being able to structure a welding gun which can meet the then required welding conditions and work interference conditions.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

As has been described heretofore, according to a method of the invention, when compared with the conventional resistance spot welding gun, instead of forming a pressure drive mechanism in the inside portion of a gun main body thereof integrally therewith, standardized unit parts such as a gun arm, a drive unit, a welding transformer, an equalizing device, a gun bracket and the like can be mounted and removed with a common base used as the reference thereof; and, therefore, as the need arises, these unit parts can be recombined together more easily according to the functions of the welding gun.

Also, according to a device of the invention, various standard units can be assembled to ready-made parts such as a drive unit and the like with the common base as the reference thereof.

According to the present invention, since the equalizing unit can also be mounted with the common base as the reference thereof, similarly to a gun arm, a welding transformer and the like, the equalizing unit can be mounted and removed as the need arises, which makes it possible to manufacture the welding machine with the weight and size thereof reduced.

Next, according to a drive unit according to the present invention, the following articles can be all satisfied: that is,
(1) Assembling accuracy can be obtained easily.
(2) Because the rigidity of the drive unit can be enhanced and the weight thereof can be reduced, the followability thereof can be enhanced in the welding operation.
(3) Adjustment in assembly and maintenance can be facilitated.
(4) It is possible to omit an electrode rotation stop mechanism which is necessary when a guide center and an electrode pressure center are present at offset positions.
(5) Since mass-producible commercial standardized products can be used, the cost of the drive unit can be reduced.

Next, according to the invention, the equalizing operation and the balancing operation are not executed according to the program stored on the robot side, but, by using an independent equalizing mechanism and a balancing air pressure circuit, an air pressure is always applied to the balancing cylinder in a direction which the balancing cylinder balances with the weight load of the whole of the welding machine. As a result of this, even if the number of robot control shafts and software for allowing the fixed-side electrode tip to touch softly or approach the work are not increased or added, simple addition of a one-shaft servo spot gun to the current number of robot shafts makes it possible to simplify the structure of the welding machine as well as reduce the installation cost of the welding machine.

Thanks to this, when compared with the conventional method in which the replacing timings and wear amounts of the electrode tips are directly controlled and the feed amounts of the electrode tips are corrected according to the wear amounts of the electrode tips, the invention does not use means for driving the robot arm according to the wear amounts of the electrode tips to thereby bring the electrode tips into contact with the works, but has only to add an independent one-shaft servo spot gun to the current number of robot shafts; that is, simple addition of the one-shaft servo spot gun is able to cope with the correction of the feed amount of the electrode tip.

Therefore, the equalizing operation is not carried out by driving the robot-side mechanism but can be executed simply by applying the air pressure circuit of a conventional equalizing cylinder to the currently used 6-shaft robot. This makes it possible to simplify the structure of the welding machine as well as reduce the installation cost thereof.

And, according to the invention, use of the common base formed of aluminum-system material can promote the reduction of the weight of the common base to thereby lighten the weight load to be carried by the robot wrist, which makes it possible to extend the life of the robot wrist.

Also, according to the invention, when compared with the conventional electric spot welding guns of C and X types, instead of incorporating the drive unit into the gun main body integrally therewith, with the rail main body of the linear guide unit as the reference, the gun arm, welding transformer, gun bracket, equalizing unit and the like can be each replaced individually as a unit according to the functions of the welding gun.

This not only eliminates the need for new design of the structure of the robot gun with a welding transformer incorporated therein but also can omit the common base as set forth in claim 1, thereby being able to promote further the structure simplification and weight reduction of the welding machine.

Further, according to the invention, the gun arm is directly connected to the output terminal of the welding transformer to thereby be able to omit a secondary bar in a welding gun of this type. This can reduce not only the number of parts and the number of man-hours required for assembling the welding gun but also the weight of the welding gun.

What is claimed is:

1. A method for assembling a resistance welding machine, said method comprising the steps of:

providing a common base of said resistance welding machine;

mounting fixedly and detachably an arm onto said common base with a first detachable securing member, said arm including an electrode tip of said resistance welding machine;

mounting fixedly and detachably a drive unit onto said common base with a second detachable securing member, said drive unit driving a mating electrode tip mating with said electrode tip;

mounting fixedly and detachably a welding unit onto said common base with a third detachable securing member, said welding unit including at least one of a welding transformer which can apply a secondary current to said resistance welding machine and a gun bracket for supporting said resistance welding machine onto a robot, said welding transformer being mounted to said gun bracket; and mounting fixedly and detachably a holding member onto said common base with a fifth detachable securing member, said holding member holding said electrode tip and detachably mounted onto a guide rail associated with a nut and shaft drive unit within said common base.

2. The method for assembling a resistance welding machine according to claim 1, further comprising the steps of:

mounting fixedly and detachably an equalizing unit onto said common base with a fourth detachable securing member, said equalizing unit has one of a function for positioning said mating electrode tip relative to said electrode tip and a function for correcting a moving amount of said mating electrode tip relative to said electrode tip.

3. A resistance welding machine comprising:

a common base;

an arm including an electrode tip of said resistance welding machine, said arm being fixedly and detachably mounted onto said common base by a first detachable securing member;

a drive unit driving a mating electrode tip mated with said electrode tip while said electrode tips are subjected to a pressing force, said drive unit being fixedly and detachably mounted onto said common base by a second detachable securing member;

a welding unit including at least one of a welding transformer which can apply a secondary current to said resistance welding machine and a gun bracket for supporting said resistance welding machine onto a robot, said welding unit being fixedly and detachably mounted onto said common base with a third detachable securing member, wherein said drive unit comprises:
 a ball screw shaft,
 a nut linearly moved in accordance with a rotation of said ball screw shaft and supporting said mating electrode tip, and
 a unit main body for rotatably supporting said ball screw shaft and guiding the linear movement of said nut while a plurality of balls are positioned between said nut and said unit main body;

a holding member holding a mating electrode tip mated with said electrode tip, said holding member being fixedly and detachably mounted onto said unit main body with a detachable securing member.

4. The resistance welding machine according to claim 3, further comprising:

an equalizing unit having one of a function for positioning said mating electrode tip relative to said electrode tip and a function for correcting a moving amount of said mating electrode tip relative to said electrode tip, said equalizing unit being fixedly and detachable mounted onto said common base with a fourth detachable securing member, wherein said equalizing unit includes an air circuit for canceling a load corresponding to a dead weight of said resistance welding machine.

5. The resistance welding machine according to claim 4, wherein said air circuit is provided with a balancing cylinder for executing at least one of an air pressure increasing and decreasing operation and a direction switching operation, to thereby obtain a weight balance of said resistance welding machine.

6. The resistance welding machine according to claim 3, wherein said common base is formed of aluminum based material.

7. A spot welding machine comprising:

a gun arm having an electrode tip;

an electrode drive unit having
 a ball screw shaft,
 a nut linearly moved in accordance with a rotation of said ball screw shaft and supporting said gun arm, and
 a guide rail body extending in parallel with said ball screw shaft and guiding the linear movement of said nut while a plurality of balls are positioned between said nut and said guide rail;

a holding member holding a mating electrode tip mated with said electrode tip, said holding member being fixedly and detachably mounted onto said guide rail body with a detachable securing member; and a welding unit including a welding transformer which can apply a secondary current to at least one of said resistance welding machine and a gun bracket for supporting said resistance welding machine onto a robot, said welding unit being fixedly and detachably mounted onto said guide rail body with a detachable securing member, wherein an electric pressure between said electrode tips are generated by said electrode drive unit.

8. The spot welding machine according to claim 7, wherein said holding member is one of a point holder including said mating electrode tip and a gun arm member including said point holder.

9. The spot welding machine according to claim 7, wherein said gun arm is directly connected to an output terminal portion of said wiring transformer.

10. A spot welding machine comprising:

a common ball screw having a right screwed portion and a left screwed portion a first gun arm having an electrode tip;

a second gun arm having a mating electrode tip to be mated with said electrode tip;

a first nut linearly moved in a first direction in accordance with a rotation of said ball screw shaft, engaged with said right screwed portion of said ball screw shaft, and supporting said first gun arm;

a second nut linearly moved in a second direction in accordance with the rotation of said ball screw shaft, engaged with said left screwed portion and supporting said first gun arm, said second direction being opposed to said first direction;

a common guide rail extending in parallel with said common ball screw shaft and guiding the linear movements of said first and second nuts while a plurality of balls are rolled between said rail and said respective nuts; and a single motor driving said common ball screw, to thereby simultaneously move said first and second nut.

11. The resistance welding machine according to claim 3, further comprising an electric servo motor for powering the drive unit.

* * * * *